July 3, 1945.  S. C. HURLEY, JR  2,379,717
ORIENTING MECHANISM
Filed June 24, 1944  4 Sheets-Sheet 3
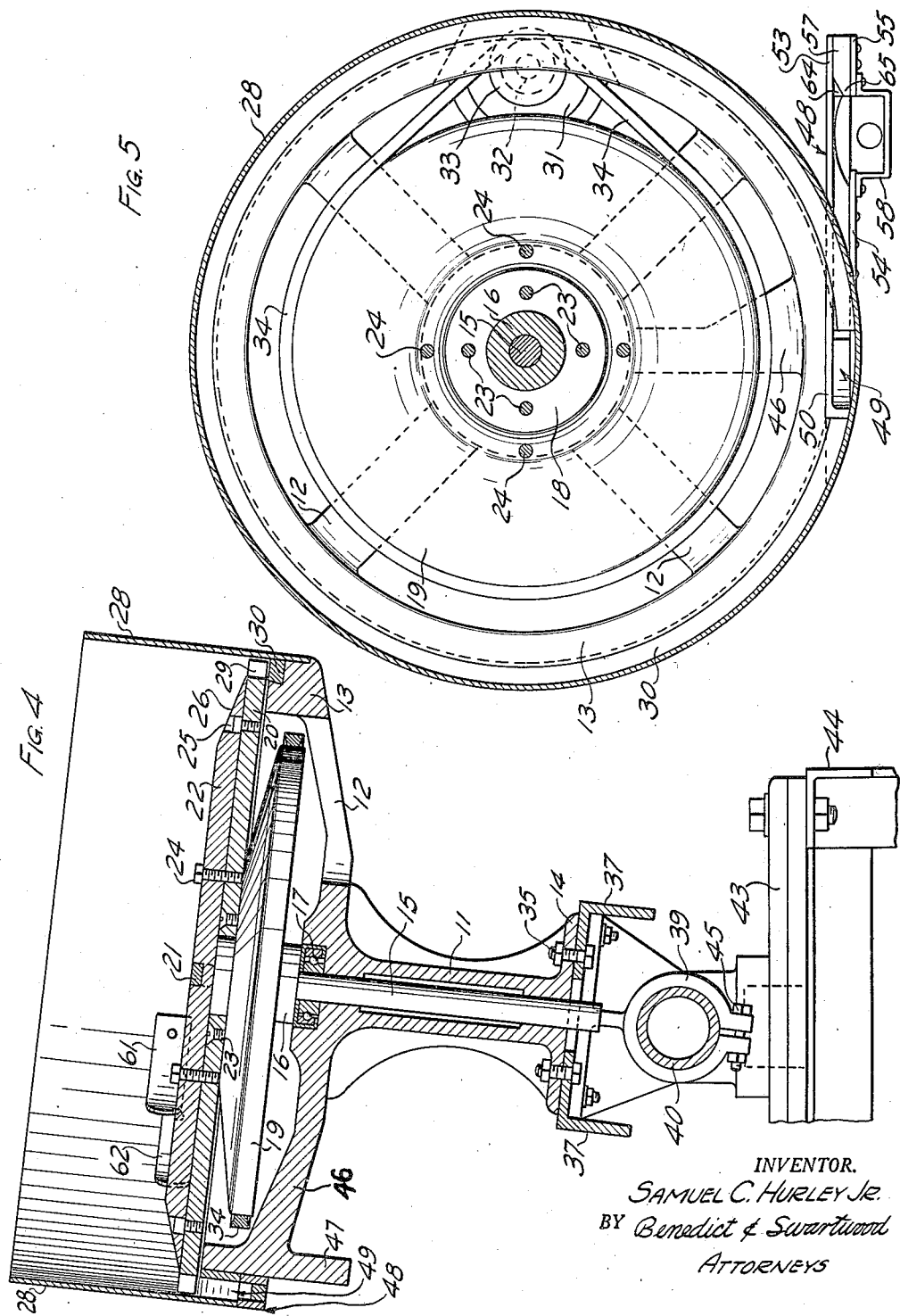
INVENTOR.
SAMUEL C. HURLEY JR.
BY Benedict & Swartwood
ATTORNEYS

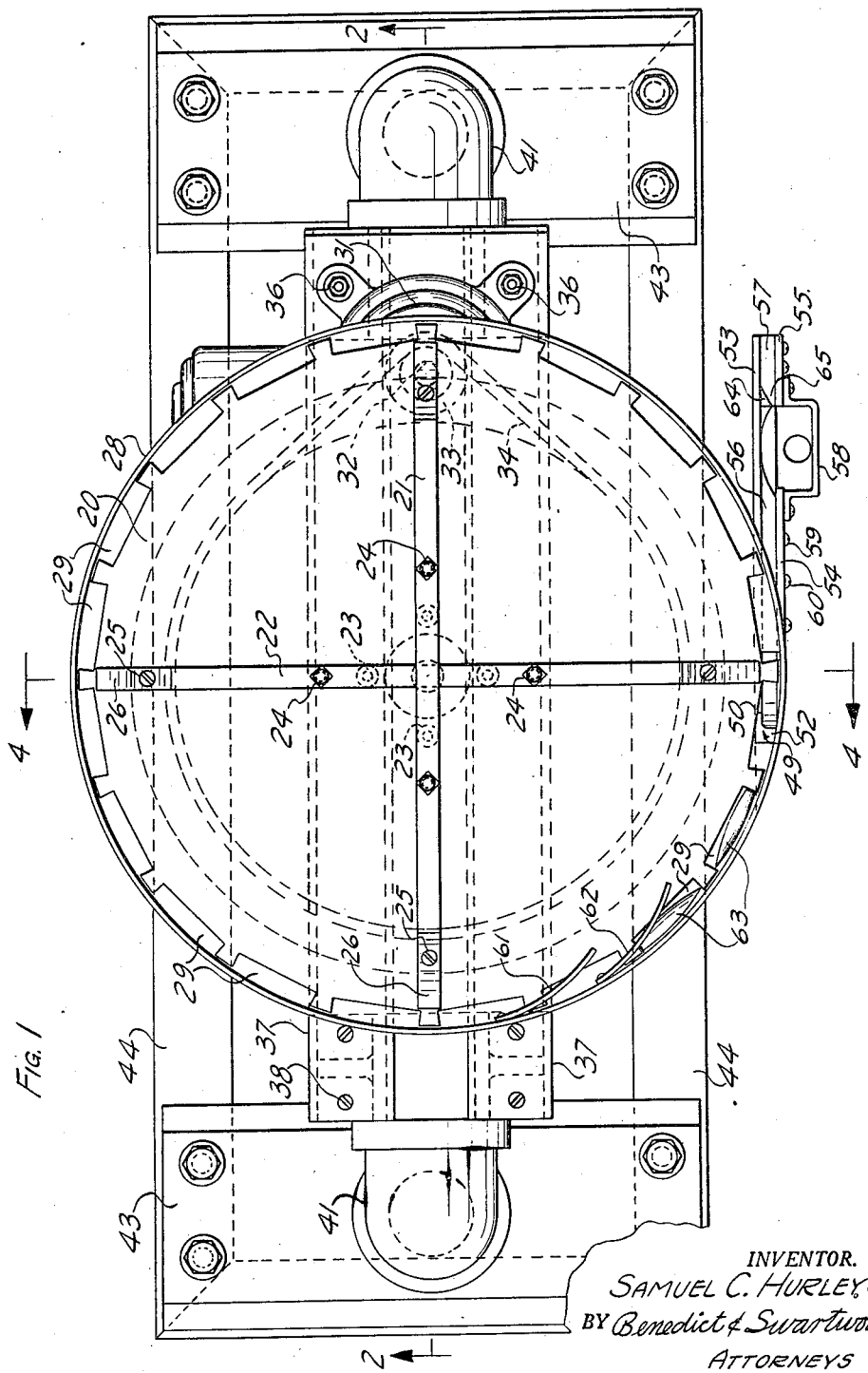

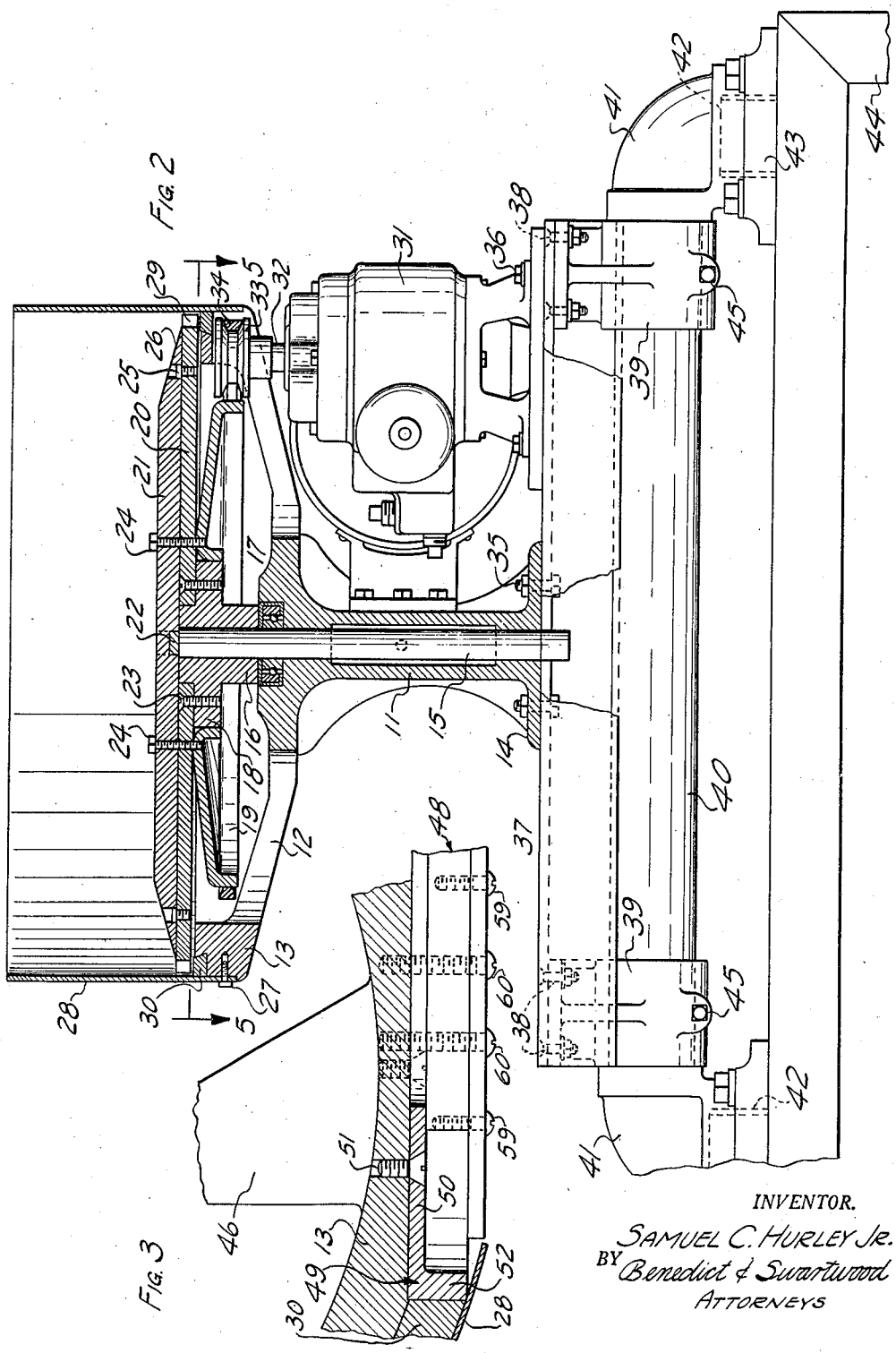

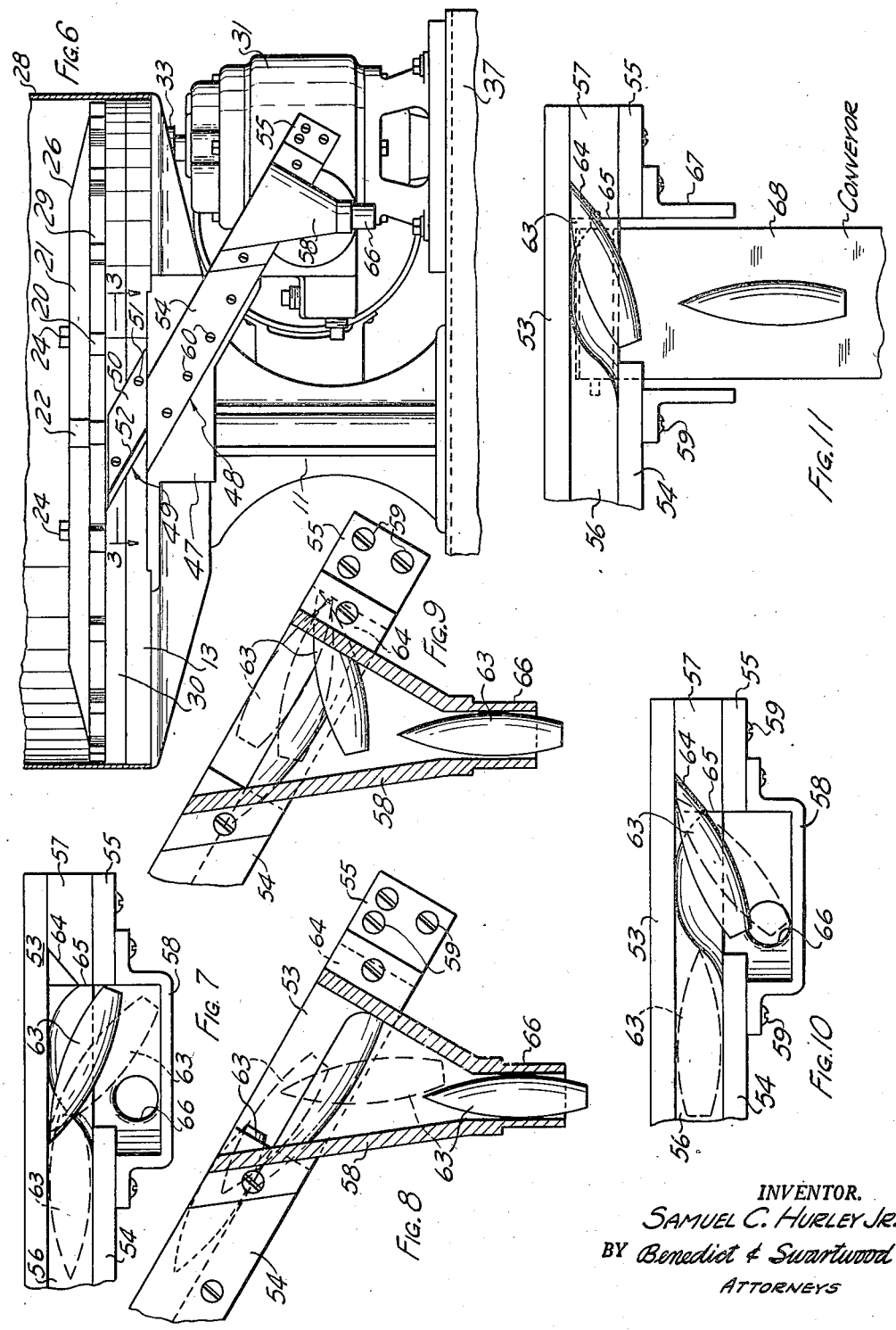

Patented July 3, 1945

2,379,717

UNITED STATES PATENT OFFICE 2,379,717

ORIENTING MECHANISM

Samuel C. Hurley, Jr., Danville, Ill.

Application June 24, 1944, Serial No. 541,959

10 Claims. (Cl. 193—43)

This application is a continuation-in-part of my copending application 483,904, filed April 21, 1943. This invention relates to a hopper for delivering articles introduced thereto in heterogeneous arrangement, individually and successively and in an oriented manner, and more specifically to a hopper device adapted to successively deliver unitary elongated objects of a substantially cylindrical nature provided with a tapered or pointed end to a delivery chute, and to means in combination therewith and said delivery chute to orient the direction of delivery of said articles therefrom.

The apparatus may be used to orient any type of object formed with one end of smaller transverse section than the opposed end. Such articles include for example, tapered bearings, bottles, shell casings, containers of various types, tapered pieces of all kinds such as bolt or screw blanks, bolts, rivets, nails, keys, cotter pins, wedges, and many other objects of the general shape described which may be cylindrical, rectangular, polyangular, etc., providing only that one end is of lesser cross section than the other. Although for purposes of convenience, I describe my invention in terms of projectiles having an ogival end, it is not limited to use with such objects.

More particularly the present invention relates to a hopper adapted to receive elongated projectiles of a given size or caliber in heterogeneous arrangement, the hopper being adapted to successively deliver individual projectiles to a delivery chute extending therefrom, the delivery chute being provided with means for orienting the direction of the delivery of the projectiles, that is, all the projectiles are caused to be delivered with their blunt or boat-tail end forward or downwardly irrespective of whether or not they were so introduced from the hopper to the delivery chute.

It is an object to provide a means for orienting articles of the character described and delivering them one after another in oriented order. For example, the articles may be discharged forwardly and downwardly through a funnel or chute; or they may be discharged in such a manner that they rest side by side with the blunt ends all in one direction. They may be discharged onto a conveyor belt or into cartons and packing cases; or into the feed mechanism of a machine for performing some additional operation. Such operations, in addition to packaging, may include filling if the articles are containers; milling or grinding, polishing, machining, etc., for example to make screws or bolts, etc.; to polish tapered bearings; to assemble, e. g. bullets and cartridge cases; inspection of pieces, etc. Many other uses will be apparent.

Projectiles or armor piercing shell or cores such as for example of 30, 50 or the like small caliber, are generally made on screw machines and are collected in trays or pans from that operation. They may thereafter be subjected to heat treating at which time the cores or projectiles are handled in a gross manner which renders it impossible to maintain them in the same orientation as delivered from the screw machine. Likewise, after the original machining operation, the articles may have been subjected to washing in a drum or similar container making it impossible to maintain them in position in a direction in which they were delivered from the original operation. However, for the purpose of subsequent operations such as centerless grinding of the body diameter, milling or grinding of the boat-tail end of the projectile or core, hand inspection of given dimensions of the core, automatic inspection of given dimensions thereof, or bringing the projectiles into a grinder for overall grinding or correction grinding and the like operations, it is necessary that the projectiles be delivered individually and successively and all oriented in a single direction.

With such end in view, it is an object of the present invention to provide a hopper adapted to receive projectiles or other articles of the class herein set forth in a heterogeneous or mixed arrangement, and to deliver them therefrom individually and successively and in an oriented manner, that is, the blunt or boat-tail end first, the delivery chute being characterized by including means for orienting the projectiles so that they are delivered in such manner from a funnel or other delivery means whereby the projectiles may be fed or thereafter handled in such orderly arrangement in the next successive operation.

Other objects and advantages will be apparent from a consideration of the following specification and drawings wherein:

Fig. 1 is a plan view of my hopper.

Fig. 2 is a vertical section through the hopper taken on the line 2—2 of Fig. 1.

Fig. 3 is a fragmentary section taken adjacent to the chute entrance opening, and on the line 3—3 of Fig. 6.

Fig. 4 is a vertical section through the hopper taken on the line 4—4 of Fig. 1, but with the hopper shown tilted on its mounting support with the forward or delivery chute entrance end elevated.

Fig. 5 is a section taken on the line 5—5 of Fig. 2.

Fig. 6 is a front elevation of the hopper assembly with part of the hopper side wall forming the holding chamber broken away.

Fig. 7 is an enlarged detailed plan view of the lower end of the delivery chute and the delivery funnel illustrating the projectile orientation means thereat, further diagrammatically illustrating the passage of a projectile coming down the delivery chute boat-tail end first.

Fig. 8 is a side elevation of the portion of the chute illustrated in Fig. 7, with the funnel in section.

Fig. 9 is a view similar to Fig. 8 digrammatically illustrating the orientation of a projectile which has been delivered ogival end first down the delivery chute so as to cause it to be delivered from the funnel boat-tail end first.

Fig. 10 is a view similar to Fig. 7 further diagrammatically illustrating the passage and orientation of the projectile in Fig. 9.

Fig. 11 shows an embodiment in which the article may be discharged laterally.

Referring to the drawings, the hopper comprises a standard 11 provided with a spider or arms 12, a rim 13, and a mounting base 14, the portions 11, 12, 13 and 14 being, if desired, formed of a unitary casting. The standard 11 is provided with a longitudinal bore which receives the shaft 15. A hub 16 is secured in any suitable manner to the upper end of shaft 15 and is seated on the thrust bearing 17 fitted into the upper end of the standard 11. The hub 16 is provided with an intermediate flange or collar 18 to which is secured the annular drive drum 19, and superimposed over the drive drum and seated on the collar 18 is a hopper feed plate 20. On the surface of the feed plate 20, there is positioned a pair of agitators or cross bars 21 and 22. The hub, drive drum and feed plate assembly may be secured together by means of the flat head screws 23 extending from the feed plate 20 to the collar 18, the plate bolts 24 extending through an agitator, the feed plate and drive drum, and the bolts 25 extending through the tapered ends 26 of the agitators into the feed plate 20. Secured to the outer periphery of the rim 13 by means of a plurality of screws such as the one indicated at 27, is the hopper side plate 28 which forms a chamber about and above the feed plate 20.

As best illustrated in Fig. 1 the feed plate 20 is slotted at its peripheral edge as indicated at 29 to provide elongated circumferentially extending slots opening to the peripheral edge of plate 20, the length and width of these slots being such as to accommodate a single projectile of a given dimension such as for example, a 30 or 50 caliber projectile or armor piercing core and the like. The rim 13 is provided with a peripheral chamfer and seats therein a hardened steel ring 30 to provide a bearing surface for the projectiles as they are received within the slots 29 while being carried to the delivery chute entrance.

For the purpose of actuating the hopper there is provided suitable drive means such as the ratio or gear-head motor 31, to the shaft 32 of which there is secured a V pulley 33, the pulley 33 extending adjacent to the drive drum 19, and the drive drum being driven by means of the V-belt 34.

The agitators or cross bars 21 and 22 ride on the surface of the hopper feed plate 20 and tend to carry some of the projectiles around in the hopper keeping them agitated and letting them assume different positions in the bottom of the hopper during the rotation of the feed plate so that they may be more readily picked up, and also tend to distribute the load of the mechanism.

For the purpose of facilitating the operation of the device, and to assist in the causing of the hopper feed plate to successively deliver single projectiles to the delivery entrance the hopper unit as a whole is preferably tilted so that the entrance to the delivery chute is in an elevated position and the greatest concentration of projectiles contained in the hopper caused by gravity to be collected at a point remote from the delivery chute entrance. This may be accomplished by mounting the hopper standard and also its drive motor, on a tiltable platform. One method of accomplishing this is shown by the illustrations wherein the base 14 of the hopper standard is bolted as at 35, and the motor likewise bolted as at 36, to the angle pieces 37 (which may, if desired, be a single channel) forming a supporting bed for the hopper and motor. This supporting bed is in turn secured by suitable means such as the flat head screws 38 to the pair of spaced apart pipe clamps 39 which embrace the horizontally extending pipe 40, the pipe 40 being supported in elevated position through the elbows 41, nipples 42 and flanges 43 to a suitable mounting base generally indicated as 44. It will readily be seen that by mounting the hopper standard on its tiltable support in a position whereby the delivery chute opening extends parallel to the pipe 40, the entire hopper may be tilted by adjustment of the pipe clamps 39 by means of their screws 45 so as to cause the hopper as a whole to be tilted at any desired angle about the pipe 40 as an axis, to cause the entrance to the delivery chute to be in a raised position or elevated above any other portions of the hopper feed plate 20.

Extending from the standard 11 and between a pair of rim supporting arms 12 is a supplemental arm 46 which extends to the rim 13 and terminates in a downwardly extending planar surfaced apron 47, the apron 47 providing a mounting surface for the obliquely extending delivery chute generally indicated as 48. Immediately above the chute 48 and forwardly offset therefrom, the rim 13 is provided with an oblique slot seating therein the slide member 49 which provides a delivery opening from the hopper or the feed plate thereof, and a defined path for admitting projectiles delivered from the feed plate 20 to the chute 48.

This element 49 is provided with a planar surface portion 50 which is secured by means of the screws 51 to a recessed planar surface portion of the rim 13, and includes the right angular bearing surface 52, the said surface 52 being inclined at an angle of about 30° to the vertical, the opposed longitudinal edge of the portion 50 being likewise inclined at the same angle. The bearing ring 30 is here split obliquely, its ends terminating at the longitudinal edges of the element 49. There is thus provided a chute entrance way which extends tangentially from the slotted peripheral portion of the feed plate 20, the horizontal cross section of the chute being substantially equal to that of one of the hopper feed plate peripheral slots, the angle of incline of the element 49 being in a generally forward direction to the movement of projectiles carried about on the slide ring 30 by means of the feed plate 20, when the feed plate is rotated in a counter clockwise direction.

In the operation of the hopper, as the feed plate 20 is rotated through the motor 31, projectiles are picked up within the slots 29, ride on the bearing ring 30, and as the projectiles approach the chute entrance they first pass the flat spring 61 secured to and extending from the inner surface of the confining wall 28 and elevated from the feed plate 20. The function of the spring 61 is to scrape out a group of projectiles which may have entered a slot 29 in a vertical position. The projectiles next pass beneath a second similar flat spring 62, which is mounted lower and closely adjacent the surface of the feed plate 20 to scrape off any projectiles which may ride up on the wall 28 in a horizontal position, to the end that when a slot 29 approaches the chute entrance there is contained therein a single projectile 63.

Thus, when a slot 29 registers with the top opening of the chute admittance slide 49, a projectile 63 carried in one of the slots 29 drops into the entrance-way, abuts against the bearing surface 52 of the element 49, and then falls in an inclined direction, either ogival or blunt end forward, to the inclined chute 48, the chute 48 being inclined at the same angle as the element 49, and having a surface portion continuous with the bearing surface 52.

The chute 48 comprises a back side plate 53, a front side plate 54, a terminal front side piece 55, a center or base piece 56 continuous with the bearing surface 52, and a tipper block 57 secured between the lower terminal end of the back side plate 53 and the front side piece 55. A funnel 58 is secured to the face of the front side members 54 and 55 and bridges the gap between their adjacent ends and then extends generally downwardly in a vertical direction and terminates in the vertical ejection nipple 66, the nipple 66 being positioned laterally of the chute base 56. The portions of the chute may be secured together by suitable means such as a plurality of screws 59, the entire chute assembly being secured to the apron 47 by means of the pair of screws 60 which extend through the portions 54, 56 and 53, and into the apron 47.

The front side plate 54 is spaced from the back side plate 53 a distance approximately equal to the widest diameter of the projectile 63, and the lower end of the front side plate 54 is spaced from the adjacent end of the front side piece 55 a distance approximately equal to the length of the projectile. The front upper corner of base piece 56, between the adjacent ends of the front side plate 54 and the front side piece 55 is beveled in a concave or arcuate manner so as to provide the base piece with an incline and to converge both longitudinally and transversely to the funnel 58, as best indicated in Figs. 7 to 10.

The tipper block 57 which is otherwise generally rectangular, is provided with a beveled edge 64, the bevel extending vertically thereof and from adjacent the front piece 55 to the back side plate 53, and leaving an abutment or remaining face portion 65 having a width slightly less than one-half of the thickness of the block 57 or base piece 56. This provides an angular recess opening into the inner face of the block 57 and between the back side plate 53 of a sufficient degree to permit entrance of the ogival end of a projectile 63 but not the blunt end thereof.

The particular shape of recess is given as illustrative of one effective and preferred embodiment, particularly when using the invention with projectiles or other objects of ogival shape. The recess may be of different shape when using the invention in connection with other articles whose smaller end is of different shape. For example, the recess may be cone shaped or a circular, oval or curved recess with substantially straight sides, the back being straight or concave in shape. The function of the recess is to provide a pivotal point for the end of lesser cross-section. It should be of such a shape preferably as to impart a lateral motion to the article being oriented, or at least so that it does not interfere with the lateral motion imparted by the sloping side of the chute when the smaller end is forward. In effect, the recess retains the small end momentarily and permits the larger end to swing laterally with the edge of the recess serving as a pivot point.

In the further operation of the apparatus, as the projectiles are delivered to the chute either ogival or blunt end forward and downward, their momentum down the incline causes them to successively abut against the tipper block 57. In the event that the projectile descends blunt end forwardly, it at best merely abuts against the face portion 65 of block 57 and continues to drop blunt end downward through the funnel 58 as illustrated in Figs. 7 and 8.

In the event that the projectile is delivered to the chute 48 ogival end forward its momentum carries it into the angular recess provided by the bevel 64, which causes the projectile to pivot about the tipper block 57 and to extend the blunt end clear of the base plate 54, and with the aid of the taper at the end of the base plate 56, the projectile is caused to drop blunt end downward and descend into and out of the funnel 58 in that manner, as illustrated in Figs. 9 and 10.

It will thus be seen that irrespective of the direction in which the projectiles are introduced to the chute 48, they are all delivered blunt end downward uniformly for a subsequent operation.

Fig. 11 illustrates another embodiment of the invention in which the article is delivered directly to a conveyor belt instead of to a funnel as shown in the preceding figures. Other modifications will be apparent.

The article pivots as previously described but instead of dropping down a funnel, it passes blunt end forward onto conveyor belt 68, passing between guides 67. By positioning the belt at an angle or providing a delaying means near belt 68 before the article has turned at right angles its former line of passage, the articles can be delivered lying side by side with the ends oriented.

Although I have described the preferred embodiment of my invention wherein the chute is inclined and fed by gravity fall of the pieces, it is within the scope of the invention to project the articles into the chute by any means. For example, I may use air pressure, springs or other devices to impart sufficient forward motion to the article so that it will be passed through the chute, be oriented and be discharged from the device. The invention is not limited to any one particular way of feeding the article to the chute, or any one way of conveying it away from the discharge end.

It will, of course, be understood that the apparatus as a whole may be dimensionally modified to accommodate a projectile of any given size, and that similar elongated objects having a pointed or concentrically reduced end may be similarly caused to be delivered in a uniform manner.

It will also be obvious to those skilled in the art that various arrangements of my hopper may be made without departing from the spirit of my invention, and that the feed plate 20 may be caused to rotate in a clockwise direction in which event the chute entrance 49 and chute 48 will

I claim as my invention:

1. A chute for receiving unit articles formed with one end of lesser cross-section than the other end and for discharging said articles in a uniformly oriented manner comprising walls to laterally confine said articles, one side wall formed with an opening adjacent the discharge end, the bottom wall formed with a laterally sloping portion adjacent the discharge end and adjacent the opening in the side wall for causing oriented articles to be discharged laterally through said opening, a terminal selective abutment means forming a closure for the discharge end of the chute, said abutment means formed with a recess providing limited pivotal ingress for the end of lesser cross-section of said article only, for orienting the unit articles.

2. A chute for receiving elongated unit articles formed with one end of lesser transverse section than the opposed end and for discharging said articles in seriatim in a uniformly oriented manner comprising walls to laterally confine said unit articles, one side wall having an opening near the discharge end, the bottom wall having a laterally sloping portion adjacent the discharge end, and selective terminal abutment means forming a closure for the discharge end of the chute, said abutment means formed with a recess providing limited pivotal ingress for the end of lesser transverse section only for orienting said unit articles and for causing them to be discharged uniformly and forward through the opening in the side wall with the ends of the greatest cross-section forward.

3. In a device of a class described comprising a chute defining a path of travel for elongated unit articles formed with one end of lesser cross-section than the other and hopper means for introducing said unit articles forwardly in seriatim to said chute, the improvement comprising selective terminal abutment means in said chute formed with a recess providing limited entrance for the end of lesser cross-section of said unit article providing a pivot point contact causing them to be discharged blunt end forwardly over a laterally and downwardly sloping bottom portion of the chute through a lateral opening provided in the opposite sidewall of said chute adjacent said bottom portion.

4. An inclined gravity chute for receiving elongated unit articles formed with an ogival and a relatively blunt end and for discharging said articles in seriatim in a uniformly oriented manner, comprising side walls to laterally confine said unit articles, a bottom formed with a laterally sloping portion adjacent its lower end, and selective terminal abutment means forming a closure for the lower end of said chute formed with a laterally opposite inclined recess providing limited pivotal ingress for an ogival end only for orienting said unit articles and for causing them to be discharged uniformly and blunt end forwardly through a lateral opening provided in one of said chute side walls adjacent said abutment means and downwardly over said sloping bottom portion into a delivery funnel depending therefrom.

5. An inclined gravity chute for receiving elongated unit articles formed with an ogival and a relatively blunt end and for discharging said articles in seriatim in a uniformly oriented manner, said chute comprising a pair of side walls spaced to laterally confine said unit articles, a bottom, selective terminal abutment means between said walls and bottom adjacent their lower ends, one of said side walls being formed with an elongated opening substantially equal to the length of one of said articles and extending to said abutment means and said bottom being formed thereat with a laterally and downwardly sloping portion, and a funnel positioned laterally of said chute and embracing said opening and extending substantially vertically downwardly therefrom, said abutment means formed with a beveled edge defining an inclined recess extending from the face thereof to the closed side wall to provide a limited entrance for the ogival end only of units introduced to said chute ogival end forward and for causing them to pivot thereabout and to be discharged blunt end outwardly through said lateral opening and downwardly through said funnel.

6. An inclined gravity chute for receiving elongated unit articles formed with an ogival and a relatively blunt end and for discharging said articles in seriatim in a uniformly oriented manner, said chute comprising a pair of side walls spaced to laterally confine said unit articles, a bottom, selective terminal abutment means between said walls and bottom adjacent their lower ends, one of said side walls being formed with an elongated opening substantially equal to the length of one of said articles and extending to said abutment means, and a funnel positioned laterally of said chute and embracing said opening and extending substantially vertically downwardly therefrom, the chute bottom being formed at said side wall opening with a beveled edge portion inclining and converging to said funnel, said abutment means being formed with a planar surface portion less than one-half the width of said chute adjacent the opening in the side wall and a beveled edge extending therefrom to the opposite closed side wall defining an inclined recess therewith, said recess providing a limited entrance for the ogival end only of units introduced to said chute ogival end forward and for causing them to pivot thereabout and to be discharged blunt end forward and outwardly and downwardly through said funnel, the planar surface portion of said abutment means being adapted to permit and cause unit articles introduced to said chute blunt end forwardly to move in a generally continuous blunt end downward direction through said lateral opening and into said depending funnel.

7. A device for orienting unit articles formed with one end of lesser cross-section than the opposed end comprising walls to laterally confine said unit articles, one wall having an opening near the discharge end, the bottom wall near the discharge end having a laterally and downwardly sloping portion and a recessed terminal abutment means providing limited pivotal ingress for the end of said article of lesser transverse section only.

8. A device for orienting unit articles formed with one end of lesser cross-section than the opposed end comprising walls to laterally confine said unit articles, one wall having an opening near the discharge end, the bottom wall near the discharge end having a laterally and downwardly sloping portion and a recessed terminal abutment means providing limited pivotal ingress for the end of said article of lesser transverse section only for orienting said unit articles and causing them to be discharged uniformly through the opening in the wall with the ends of greatest cross-section forward, and means for removing the unit articles thus oriented.

9. A gravity chute for receiving elongated unit articles formed with one end of lesser transverse section than the opposed end and for discharging said articles one at a time in a uniform manner comprising side walls to laterally confine said unit articles, a bottom formed with a laterally sloping portion adjacent its lower end and terminal abutment means forming a closure for the lower end of said chute formed with a laterally opposite entrance recess providing pivotal ingress for the end of lesser transverse section only for orienting said unit articles and for causing them to be discharged uniformly with the larger end forward through a lateral opening provided in one of said side walls adjacent said abutment means and outwardly over said sloping bottom portion into a conveying means.

10. A device of the class described comprising means for projecting unit articles formed with one end of lesser cross-section than the opposed end into a passageway comprising walls to laterally confine said articles, said passageway being provided with an opening in the side adjacent the discharge end, said opening being at right angles to a vertical plane bisecting the passageway, the passageway being formed with a laterally sloping portion for causing the oriented articles to be discharged laterally through said opening, and a recessed terminal selective abutment means forming a closure for the passageway, said recess providing limited pivotal ingress for the end of said article of lesser cross-section only for orienting the unit articles.

SAMUEL C. HURLEY, Jr.